Oct. 5, 1926.
A. ROBERTS
1,601,741
COKE OVEN AND THE LIKE
Filed Sept. 13, 1920    8 Sheets-Sheet 5
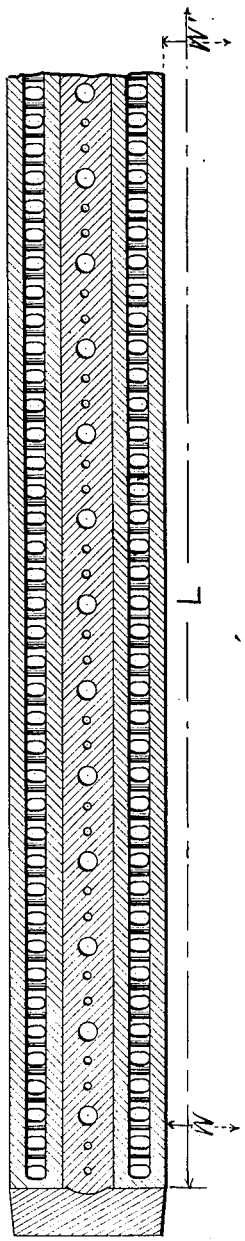
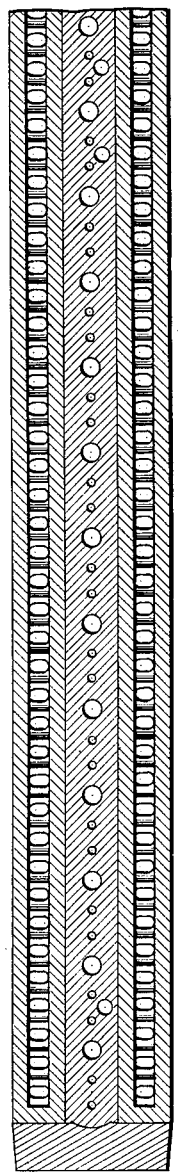
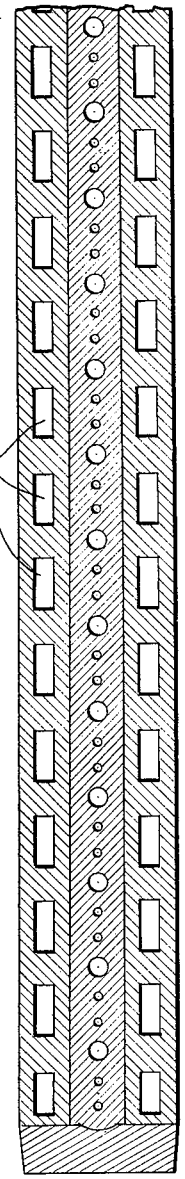
Inventor
Arthur Roberts
by
Attys Oct. 5, 1926.
A. ROBERTS
1,601,741
COKE OVEN AND THE LIKE
Filed Sept. 13, 1920  8 Sheets-Sheet 6
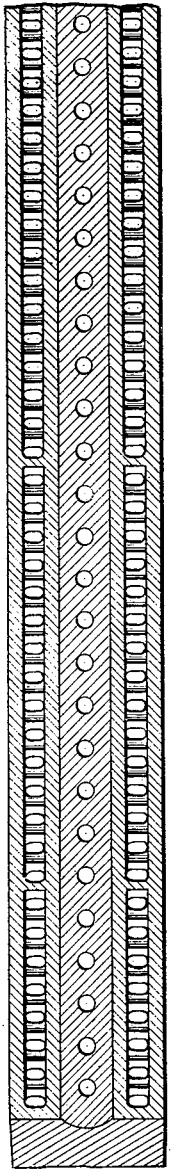
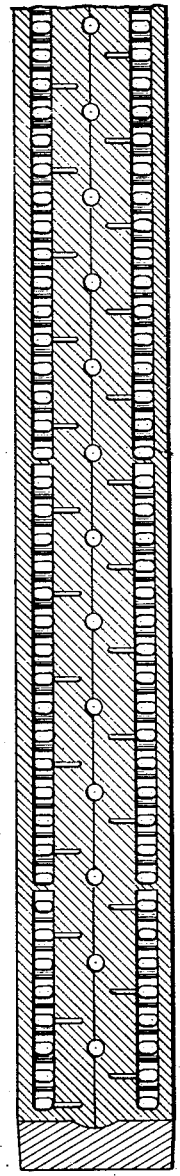
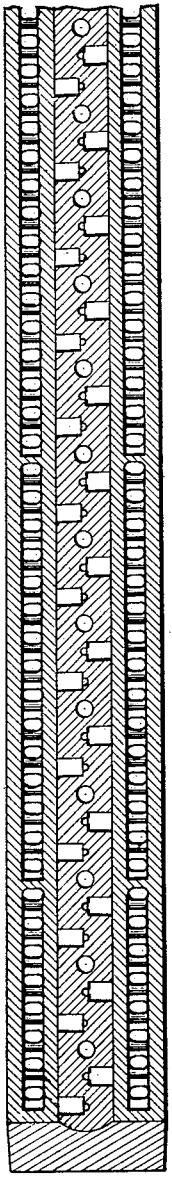
Inventor
Arthur Roberts Oct. 5, 1926.
A. ROBERTS
1,601,741
COKE OVEN AND THE LIKE
Filed Sept. 13, 1920    8 Sheets-Sheet 7
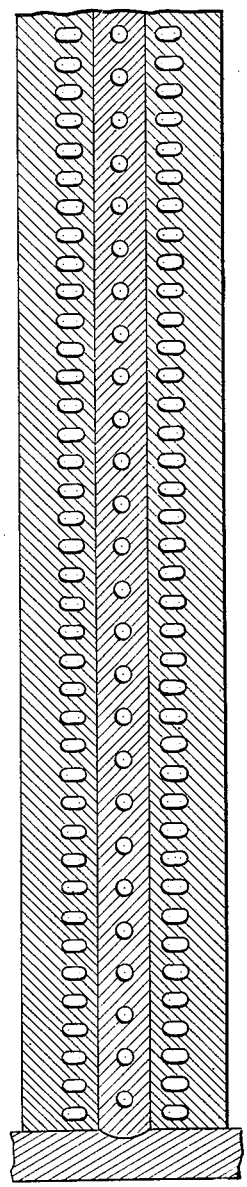
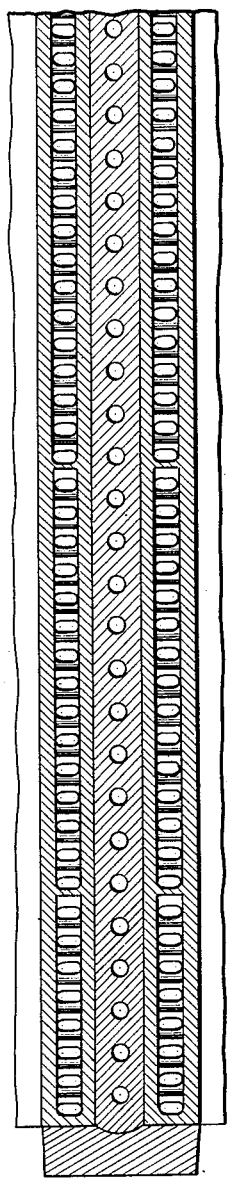
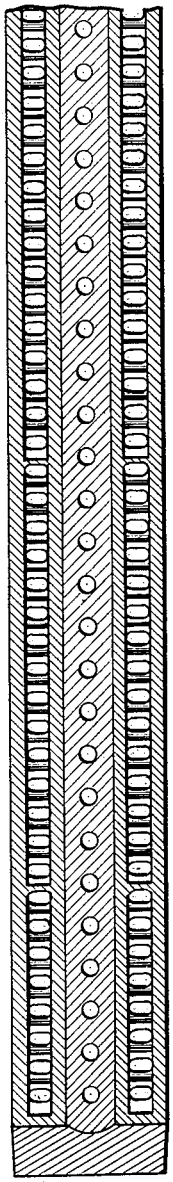
Fig.16.   Fig.15.   Fig.14.
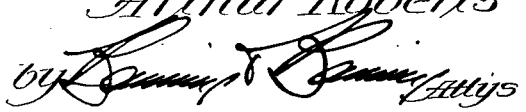
Inventor
Arthur Roberts Oct. 5, 1926.

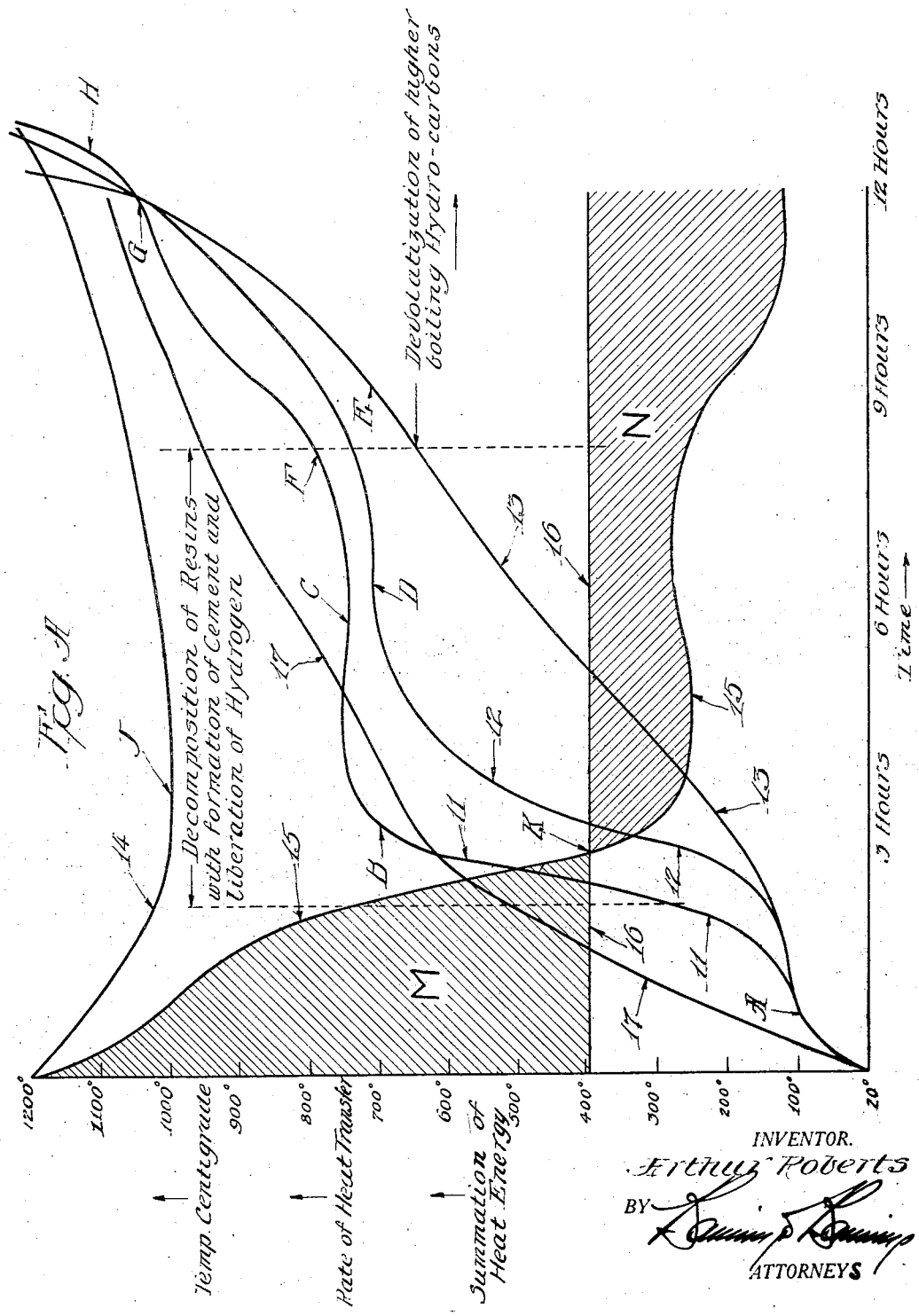

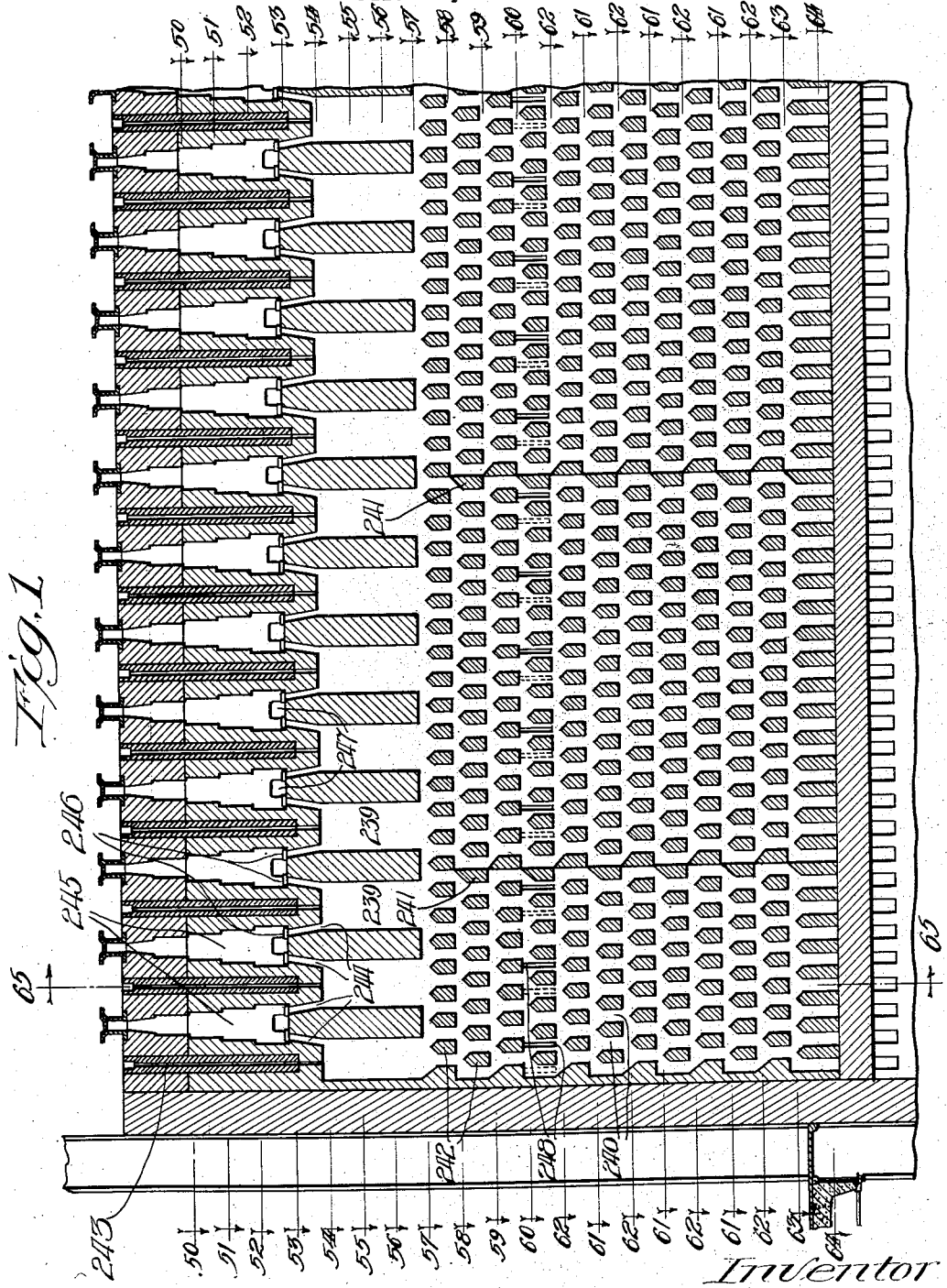

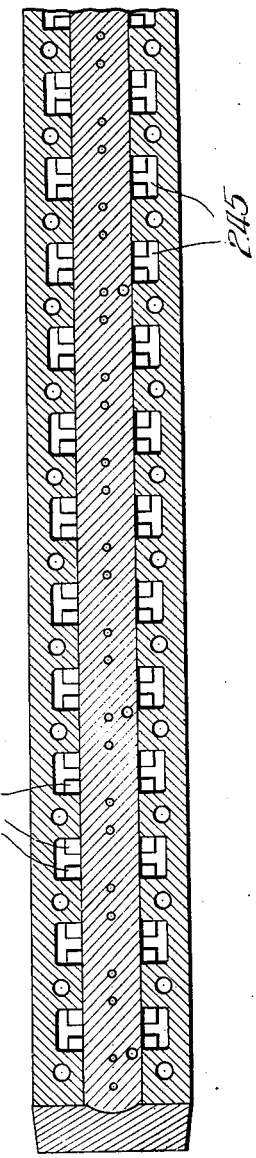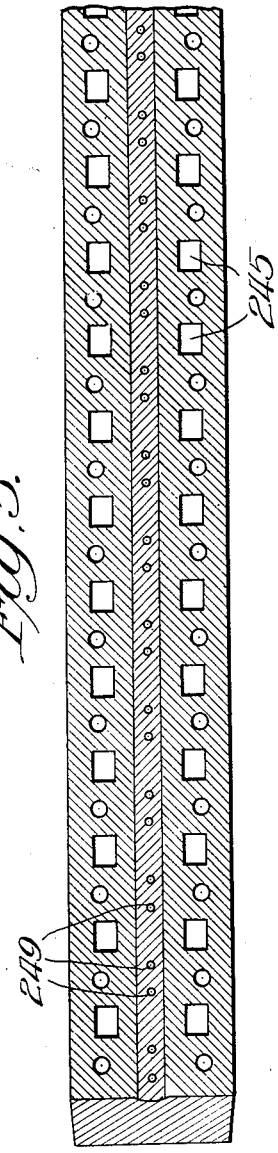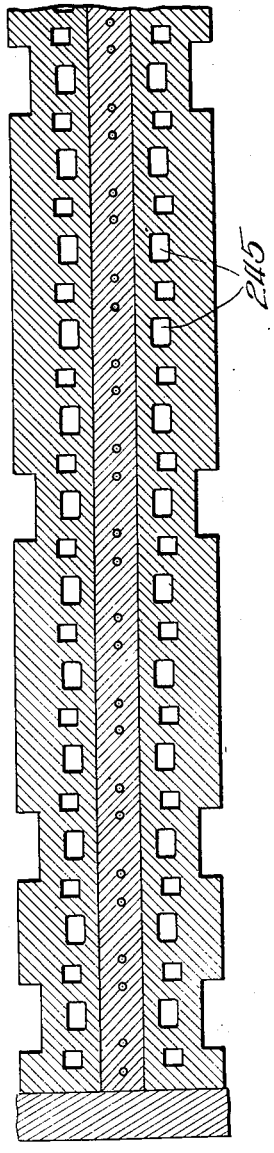

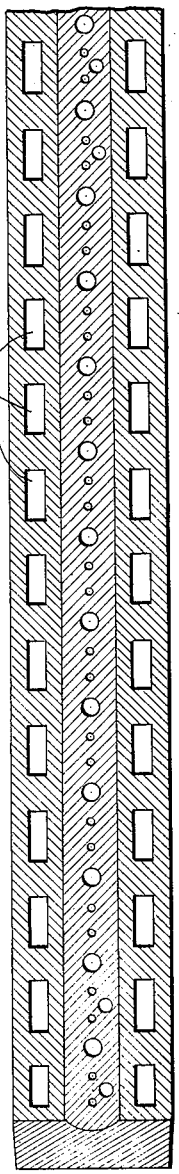
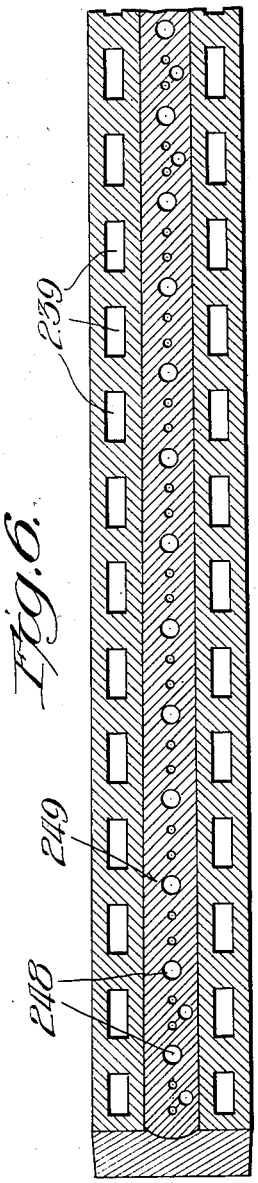
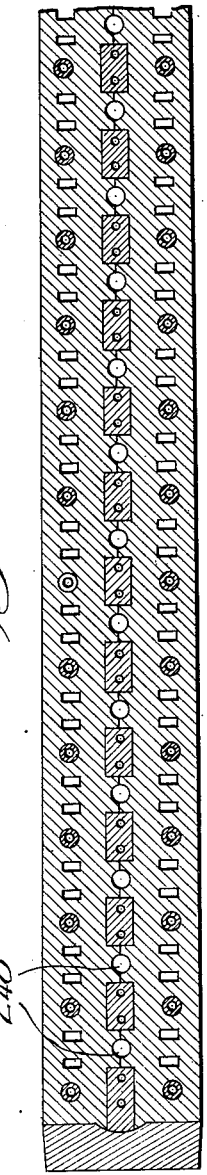

A. ROBERTS 1,601,741

COKE OVEN AND THE LIKE

Filed Sept. 13, 1920    8 Sheets-Sheet 8

Inventor
Arthur Roberts
by [signature], Attys

Patented Oct. 5, 1926.

1,601,741

UNITED STATES PATENT OFFICE.

ARTHUR ROBERTS, OF EVANSTON, ILLINOIS, ASSIGNOR, BY MESNE ASSIGNMENTS, TO CHICAGO TRUST COMPANY, TRUSTEE, OF CHICAGO, ILLINOIS, A CORPORATION.

COKE OVEN AND THE LIKE.

Application filed September 13, 1920. Serial No. 409,888.

The present invention has to do with improvements in retort coke ovens. The invention has reference to the construction of such ovens having characteristics which enable them to coke a very large class of coals formerly classed as "non-coking" as well as enabling them to coke the so-called "coking coals" in improved manner and for the production of an improved quality of coke and with an increased yield thereof. Those characteristics of ovens capable of coking said so-called "non-coking coals" will be hereinafter disclosed and claimed; but in order that they may be better understood and the lines of distinction from the prior art may be better appreciated, I will first explain in a general way some of the characteristics of the so-called "non-coking" coals, and will point out the process by which a large class of said coals may be compelled to yield to the coking function and produce excellent metallurgical coke.

In my co-pending application for Letters Patent of the United States on improvements in the art of coking coal, Serial No. 341,696. filed December 1, 1919, as a continuation of my earlier application, Serial No. 309,996, filed July 11, 1919, I have pointed out that there is very large class of coals considered to be non-coking, in which coals there is an amply large supply of volatile matter; and have pointed out that as examples of such coals may be cited large deposits contained in a number of counties in Illinois. In that application, I have pointed out that while such coals are endowed with a high percentage of volatile matter—in many cases considerably higher than that contained in the so-called coking coals—still on account of the high percentage of disposable oxygen as compared to the percentage of available hydrogen, it becomes necessary to treat such coals to a particular heat treatment in order to convert the resinous constituents into cementing material at the right time for the production of a metallurgical coke structure. Otherwise this relatively large percentage of disposable oxygen will destroy such a large portion of the resinous material, or such a large portion of said resinous constituents will be evaporated and driven out of the retort that there will not remain a sufficient proportion of them to bring about the necessary binding action at the proper time for the creation of the metallurgical coke structure.

In that application I have pointed out the fact that during the coking process the available hydrogen will combine with a portion of this destroying oxygen so as to neutralize the same and correspondingly lower its deleterious action; and have also pointed out that this beneficial action of the available hydrogen may be practically measured by the ratio which it bears to the destroying oxygen known as the hydrogen oxygen ratio. In that application I have pointed out that in practically all of the coals formerly classed as coking coals, this ratio has exceeded 58%; and that those coals in which the ratio is less than 58%, have been classed as non-coking coals. In that application I have also disclosed the heat treatment to which these so-called "non-coking" coals may be subjected in order to diminish the damaging effect of the disposable oxygen, and in order to conserve the resinous materials to such an extent as to make it possible to convert these coals into excellent metallurgical coke.

In that application, I have disclosed certain of the characteristics of ovens capable of practicing the said process, and have shown the manner in which said ovens may be caused to operate for the practicing of the process. I will now explain more in detail the characteristics of ovens for practicing said process, and in doing so will also explain the coking process itself to a sufficient extent.

The raw coal contains materials which, when the coal is heated, will either be driven off as volatile constituents or left in the retort as a residuum. The coke structure is formed, if at all, by binding together the particles of residuum in the proper manner. This binding action is secured by the conversion into binding materials of certain of the constituents originally present in the coal; but the formation of the binder at the right time and in the proper manner for the production of the metallurgical coke structure depends upon the heat treatment. The binding materials are produced chiefly from the resinous constituents which, however, are highly volatile and are subject to oxidation by the disposable oxygen present in the coal. The available hydrogen will, to some extent, neutralize the damaging effect of such oxygen by combining with it for the production of water vapor which will pass off from the retort along with the constituents which are vaporized and carried away.

The conversion of resinous materials into binding agents takes place at a temperature in the neighborhood of 600–750° C.; and, therefore, if the metallurgical coke structure is to be formed, each portion of the mass in the retort must be brought to this temperature with a sufficient portion of resinous materials to provide a binding agent. High temperature is not essential for this purpose, but rather it is necessary to have a rapid introduction of heat units to raise the temperature at each point to the critical degree before too large a portion of the resinous raw material has been either driven off or destroyed.

In the usual form of retort coke oven, use is made of a practically air-tight chamber having a pair of side walls which are heated in any suitable manner, usually by flowing hot gases through them, generated by the combustion of suitable fuel gas. This fuel gas may be derived from an entirely separate source, or may comprise a portion of the products of distillation from the retort ovens themselves. The ovens are generally operated as nearly continuous as possible, a fresh charge of raw material being introduced as soon as possible after removing the coke from the previous operation. This means that a fresh charge is introduced into a hot retort wherein there is stored a certain amount of sensible heat. The distilling process begins immediately in those layers of material close to the walls, and as the volatile constituents are vaporized, they tend to flow away from the hot walls towards the middle of the mass, depositing a portion of their constituents within and through the body of the mass by condensation. The remaining uncondensed constituents flow to the central portion of the mass and are withdrawn as volatile products for subsequent disposal.

Naturally the portions of the mass closest to the hot walls rise in temperature most rapidly; and as the heat penetrates towards the center of the mass, the temperature rises more slowly because such heat has to pass through an increasingly thick layer of coked or partially coked material which has a low heat conductivity. The relatively slower heat penetration thus occasioned is to some extent balanced by an improved condition on the interior portions of the mass, since those tarry constituents which were previously vaporized from the outer layers and carried into and condensed within the inner portions of the coking mass tend to improve its condition by enrichment of its tarry constituents, and since the materials so condensed on the inner portions of the mass necessarily carry a large amount of heat directly to the inner portion, which heat is released when they are condensed.

The flow of heat from its initial condition in the heating gases traveling through the passages of the heating walls to its final condition within the different parts of the coking mass, depends upon the temperature gradient. The flow of heat from the wall surfaces into the coking mass depends largely upon the amount of material in the retort per unit area of the retort walls, and in order to ensure a very rapid flow of heat into the distilling mass, the amount of material present per unit area should be made as small as is consistent with practical requirements. This means reduced width of oven and correspondingly smaller capacity per charge. It has been found, however, that a sufficiently rapid heat penetration may be secured at all points to coke the so-called noncoking coals without reducing the width of the retort beyond the practically feasible width as determined by practical conditions.

Immediately upon the introduction of the fresh charge into the retort, the most rapid flow of heat from the walls to the charge commences. This rate of flow is most rapid during the first stages of the process since the temperature gradient is then steepest. The heat energy transmitted into the charge may come either from the mass of the walls themselves, or from the heating gases flowing through the heating passages, or from both of these sources simultaneously. The heat which comes from the heating gases and is delivered almost immediately to the charge simply passes through the wall structure as a conducting medium and is not stored up in such structure for any substantial length of time. In order to coke the charge of non-coking coal within the retort, the rate of heat transmission into said charge must at all times be of that sufficiently large volume to ensure conversion of a sufficient proportion of the resinous materials into binding agents before excessive destruction or removal by evaporation according to the process disclosed in the aforesaid application for Letters Patent of the United States.

The critical portion of the coking process is that portion during which the temperature is being raised to the critical point of 600–750° C. If this sufficiently rapid introduction of heat is to be secured, it will either be necessary to have a sufficient quantity of heat stored up in the mass of the walls to perform a very substantial portion of the first stages of the heating process; or it will be necessary to provide an arrangement by means of which fresh heat may be delivered into the walls and transmitted through said walls in a sufficiently rapid manner. In the first case, an increased mass of heat storing material in the walls is called for; in the second case an arrangement must be provided giving an increased heat generating and transmitting function. In either case it will be understood that the quantity of heat is spoken of, measured in units of heat energy, as distinguished from intensity of heat measured as temperature.

The common practice in present day coke oven construction is to heat the walls by the combustion of fuel gas as has been previously mentioned herein. When the heat is generated in this way, the ability of the walls to absorb the heat from the gases and pass it through to the surface of the retort chamber must be sufficiently large to accomplish the desired result, whether the early stages of the coking process be performed largely by heat previously stored in the walls, or by heat freshly removed from the heating gases. Since the increased ability of the walls to abstract heat from the gases will generally entail the use of more numerous heating gas passages, and of more complex form, it will generally be desirable to strike a balance, using a sufficient mass of heat storage structure to take care of the initial high demand for heat, and using the fresh heat from the heating gases largely to replenish the supply of heat in the reservoir during the later stages of the process.

Referring now to Figure A of the drawings, the same shows a series of curves illustrating in characteristic manner the general form of temperature changes occurring in different portions of the coking mass, and in the heating walls at different stages of the coking cycle. It also shows by certain other curves the variation of heat demand at different portions of the coking cycle. All of these curves may be designated characteristic curves of the process. Time is shown on the horizontal axis, and temperature centigrade, as well as summation of heat energy and rate of heat transfer on the vertical axis. Curves 11, 12 and 13 show, respectively, in characteristic manner the variations of temperature at a point close to the heating wall, at a point farther removed from the heating wall, and at the center of the mass respectively. Curve 14 shows the average variation of wall temperature with respect to time; curve 15 shows the variation of difference between average wall temperature and temperature of the coking mass at a point close to the wall; curve 16 shows the rate of flow of fresh heat from the heating gases into the wall structure; and curve 17 shows the summation of heat units transmitted into the coking charge at different portions of the coking cycle.

In plotting these curves, it is assumed that the initial wall temperature was approximately 1,200° C., and the initial temperature of the charge was approximately 20° C. Considering first curves 11, 12, and 13, it is observed that they rise substantially to a point representing 100° C., the boiling point of water, where they rest for a sufficient length of time to evaporate the free water contained in the different portions of the mass. Thereafter they rise at successive times. The curve 11 rises most rapidly to the critical temperature being in the neighborhood of 700° C., where it rests more or less evenly while the resinous materials are being decomposed with the formation of cement and liberation of hydrogen. This is the portion "C" of said curve being adjacent to the knee B. The curve 12 rises at a later time to a similar knee D, but ordinarily the interval during which this portion of the mass remains linear the critical temperature will be smaller than is the case for the curve 11 since certain of the transformations have been taking place in the zone of the curve 12 before the temperature has reached the critical stage. The curve 13 rises last to the point E. All portions of the mass subsequently rise in temperature more or less rapidly after the critical stage has been passed; and during these last stages of the process, the higher boiling constituents are being removed, so that the finished coke will not be "green." Ultimately the charge is pushed substantially at the point G, and the retort is then ready for another coking cycle.

Considering the curve 14 it is observed that it first falls more or less rapidly to the point J where it reaches a minimum; afterwards it rises again substantially to the initial temperature when the coking process has been completed. The falling portion of this curve represents a surrender of heat energy to the coking charge, during which operation the walls are performing their function of a heat reservoir. It will be noted that this surrender takes place during the early stages of the coking process, and is, therefore, of material assistance in raising the temperature of the mass rapidly to the critical point. As long as the curve 14 is falling, the coking charge is demanding heat energy more rapidly than said energy is being generated in the walls from the heating gases or otherwise; when the minimum point J is reached, the rate of heat demand by the charge is equal to the rate of fresh generation; and when the curve 14 is rising, the rate of heat demand from the walls is less than the rate of fresh heat generation.

Assuming that fresh heat is generated at a substantially uniform rate, as by a fixed setting of the burners, the curve 16 will be substantially a straight line, representing a substantially uniform input of fresh heat energy into the walls. Actually there may be a slight fluctuation in this rate, but for all practical purposes, it will be substantially constant.

The curve 15 represents the rate of demand for heat by the charge from the walls as the same fluctuates with time. This demand may be substantially represented by the difference in temperature between the mass close to the wall and the temperature of the wall itself, taking account of the circulation of distillate gases against the surface of the wall. This curve, 15, therefore represents substantially the difference in elevation between the curves 11 and 14 at all points. The rate of heat demand is initially very large, as represented by the height of the curve 15, and falls rapidly during the early stages of the cycle. The difference between the heights of the curves 15 and 16 represents the difference in rate of heat demand as compared to fresh heat input into the walls; and as long as the curve 15 is higher than the curve 16, the demand is greater than can be satisfied by fresh heat input so that the walls are performing their function of a reservoir giving up heat. When the curve 15 falls below the curve 16 the demand is less than the rate of fresh heat input, and the walls are then serving as a reservoir taking up heat in anticipation of the next cycle.

The area M contained between the curves 15 and 16 to the left of the intersection point K represents the quantity of heat which the walls give up during the first portion of the process; and the area N between said curves to the right on this point of intersection represents the quantity of fresh heat taken into and stored in the walls during the latter stages of the process. If the walls are in the same temperature condition at the conclusion of the process as at the beginning, these areas M and N will be equal.

The area M is a measure of the heat storage capacity which it is desirable to have in the walls in order to be able to coke the coal with a constant rate of fresh heat input. It is, of course, desirable to use a constant rate of fresh heat input in order to avoid the complications of necessary adjustments, and because the heating elements will operate best and most efficiently under constant conditions.

The heat storage capacity of the walls is measured as the product of their mass times their specific heat, assuming that all portions of the mass are substantially effective for a rapid delivery of heat to the retort chamber. Experience has demonstrated that if the mass of wall structure present and effective for a rapid transfer of heat to the charge be approximately 3.8 times the mass of the charge, it will be possible to coke the charge for the production of excellent metallurgical coke from the so-called non-coking coals in which the hydrogen oxygen ratio is less than 58%. This is on the assumption that the heat storage structure be made of silica which has a specific heat of approximately .20 as compared to 1.00 for water; and, of course, if the material have a different specific heat, the mass should be modified inversely in the ratio which said different specific heat bears to .20.

Experience has also demonstrated that if the retort have a width of 12 to 16 inches, it will be possible to secure a sufficiently rapid heat penetration at all stages of the process to ensure coking of the full charge for the production of excellent metallurgical coke from such non-coking coals. In this connection it may also be stated that the amount of coal in the retort may under such conditions be approximately 29-30 pounds per square foot of heating surface of the retort.

The ability to deliver the fresh heat into the charge depends largely upon the ratio which the area of heating surfaces within the gas passages bears to the area or surface from which the heat is delivered into the charge, being the area of the retort walls. If the area exposed to the heating gases in the passages be approximately 2.25-2.50 times as large as the area of heating surface in the retort, it will be possible to coke such non-coking coals for the production of excellent metallurgical coke. In this connection, the mass of coal present in the retort per unit of area exposed to the heating gases in the passages should not be excessive, and if the structure be such that approximately 12-13 pounds of coal be present in the retort per square foot of surface in the heating passages, it will be possible to coke such non-coking coals to produce excellent metallurgical coke.

Considering the heat storage ability a little further, it follows that when using the ratio 3.8 as representing the mass of silica in the walls, as compared to the mass of coal in the retort, the heat storage ability of the walls will equal 3.8 times .20 being .76, so it may be stated that if the heat storage ability of the walls equals .76 times the mass of the charge, the coking process of the said earlier application may be successfully prosecuted. This means also that the area M between the curves 15 and 16 should equal substantially .76 times the mass of the charge, when said area is represented in heat storage units.

It is not necessary in order to practice the coking process of the said application, Serial No. 341,696, that use should be made of any particular form of oven construction, provided the structure itself will comply with sufficient of the general characteristics hereinbefore explained. However, for purposes of convenience in illustration, and not in any sense as a matter of limitation on the scope of the present invention which will be hereinafter defined in the claim, I have illustrated in the drawings certain general types of coke oven construction capable of practicing the said process and will now describe and explain them more in detail. In doing so, however, I wish to emphasize the fact that many other types and arrangements of oven than those illustrated herein may be used to practice the process of said earlier application and also emphasize the fact that the ovens now to be particularly disclosed, as well as others embodying the features of the present invention may be used for the coking of other coals than such so-called "non-coking" coals, and in many cases with an improved yield and quality of product, both coke and volatile.

In the drawings I have illustrated nine oven constructions embodying the features of the present invention. These I will designate as ovens A, B, C, D, E, F, G, H, and I.

Ovens A and B are of the vertical heating flue, horizontal transfer flue, regenerative type, oven A being provided with a single heating wall between each pair of chambers of the bench, being one heating wall for each oven; while oven B is provided with two heating walls between each pair of chambers, being two heating walls for each oven.

In the drawings, the oven illustrated is of the so-called flueless type in which the heating walls are provided with a series of interconnected passages as distinguished from distinct individual flues.

Referring now to the drawings:

Fig. A shows graphically the variation of temperatures and rates of heat transfer and summation of heat energy with respect to time.

Fig. 1 is a longitudinal vertical section through substantially one-half of a heating wall of the oven;

Figs. 2 to 16 inclusive are horizontal sections taken on the lines 2—2 to 16—16 inclusive of Fig. 1;

Figure 17:
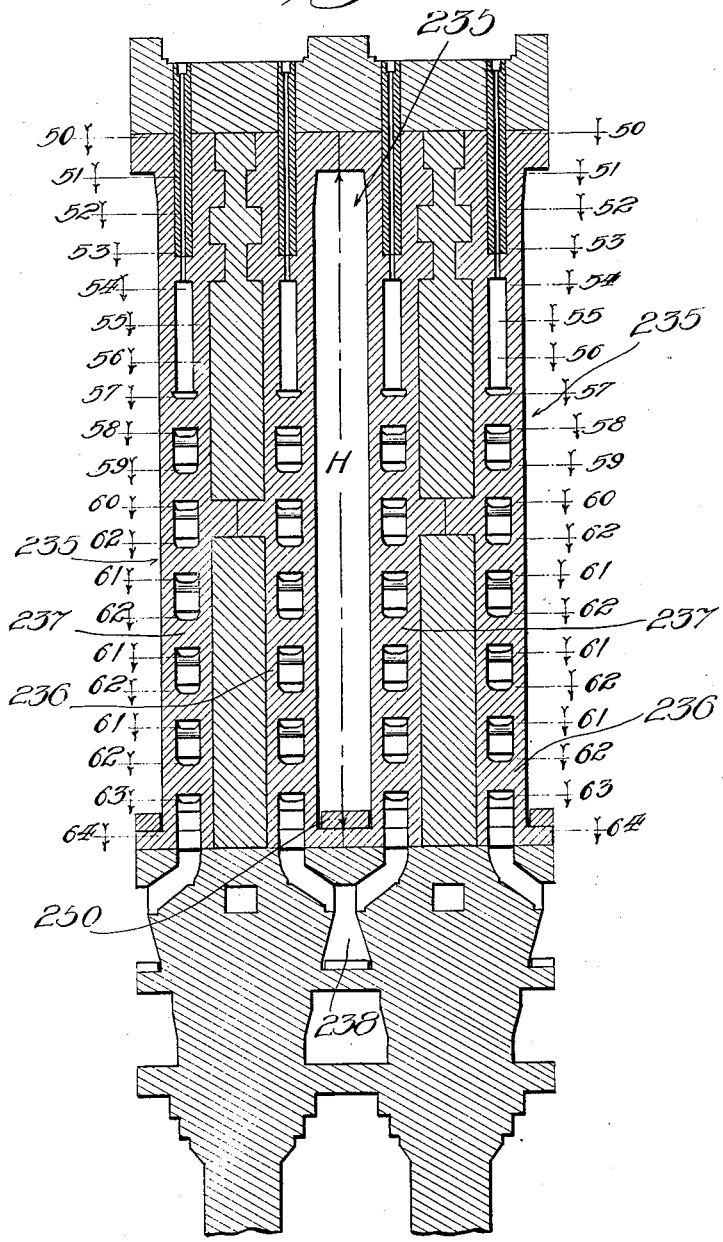
Fig. 17 is a vertical cross section taken on the line 17—17 of Fig. 1 looking in the direction of the arrows.
Figure 18:
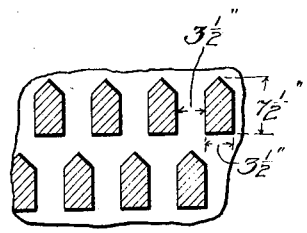
Fig. 18 is a fragmentary detail longitudinal section through a portion of a heating wall of the oven on enlarged scale.
Figure 19:
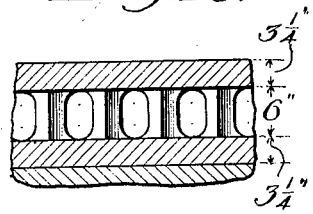
Fig. 19 is a fragmentary detail horizontal section through a portion of a heating wall of the oven on enlarged scale.

I will now describe the construction of the oven more in detail. In doing so, I will mention the more important dimensions and the fundamental proportions. The oven herein disclosed is provided with heating walls of silica; and of course if any other material were to be used, certain of the proportions should be modified according to the ratio of the specific heat of such other material as compared to that of silica which has been estimated to be .20 as compared to 1.00 for water. Furthermore, the oven which I will describe is provided with a coking chamber having substantially 600 cubic feet capacity, and is intended to handle a charge of approximately 15 tons of pulverized coal.

Furthermore, I have illustrated my invention as being comprised within a portion of a bench of coke ovens since it is the general practice to construct the coke ovens close together and on a common substructure; but in so doing, I wish to state that my invention is not limited to this in coke ovens so brought together into a bench or on a common substructure.

In construction illustrated use is made of heating walls of the flueless type in which the interior of the wall is provided with a series of more or less interconnected passages through which the heating gases flow, and within which a more or less free interchange of gases between different portions of the wall is permitted. More particularly the construction illustrated is one which includes a series of more or less distinct combustion chambers along that portion of the wall in which the combustion process commences.

The particular construction illustrated in the drawings is one which makes use of two distinct heating walls for each oven, so that the heating walls of each oven are distinct from those of the other ovens of the bench, and so that each heating wall serves to deliver heat in only one direction to only one chamber. Furthermore, the particular construction illustrated in the drawings makes use of a separating or partition wall between the heating walls of consecutive ovens. I wish to mention at this point that as far as the features of the present invention are concerned they might be embodied also in ovens or benches of ovens whether making use of such partition walls or not, whether making use of one or two heating walls between each pair of chambers, and whether using such combustion chambers or not.

Referring now to the figures which illustrate the construction of one form, each oven chamber 235 is provided with its heating walls 236 and 237. The gases for combustion are initially introduced into the upper portions of these walls and travel downwardly through them to their lower edges. Beneath the sole of each chamber is a sole passage 238 by means of which the spent gases from both walls of the chamber above are collected. These gases may then be discharged either to the stack or suitable regenerating or recuperating apparatus in accordance with the well known principles.

It will be understood that when Figs. 2 to 16 are referred to they illustrate the two consecutive or adjoining walls of two adjacent ovens, and the intervening partition wall. This method of illustration is adopted as a matter of convenience and to simplify the drawings.

Within the upper portion of each heating wall is a series of combustion chambers 239 whose lower ends deliver directly into the upper portion of a mesh work of interconnected passages which extend in zig-zag fashion to the lower portion of the wall. These interconnected passages may, as far as the present invention is concerned, intercommunicate throughout the entire wall from end to end, or through only a portion of the wall, within which portion however the gases are free to move or interchange. This latter form is the one illustrated in the drawings. The wall is subdivided by a series of vertical partitions 241 into a number of sections. I wish to mention at this point that in the drawings I have shown only substantially one half of the length of the walls, doing so as a matter of convenience and to simplify the drawings.

The interconnected passages 240 are established by ribs 242 which extend across the space within the wall. The manner of placing these ribs will determine the form of the mesh work of passages, and the shape and size of the ribs will determine the mass of material which they contain. In the particular form illustrated the ribs are so placed that the passages are of zig-zag form for gases flowing in a generally vertical direction.

Above each of the combustion chambers 239 is a gas nozzle 243; and air is introduced into each of the combustion chambers through one or more ports 244. These ports receive their air from chambers 245 above them and under the control of dampers 246. The air may be introduced into said chambers in any suitable manner as by means of side connections 247 which in turn communicate with vertical air risers 248 in the adjacent partition wall 249. The air rising through the risers 248 comes from the foundation, and may be preheated by means of recuperators, regenerators or other apparatus.

In those cases in which the correct quantities of air and gas for complete and perfect combustion are introduced into the chambers 239 full combustion will take place and the temperature of the gases will commence to fall and will continue to fall until the gases are finally discharged from the lower portion of the wall unless means be provided for reinforcing the combustion during its travel through the wall. Such means is illustrated in the present case. It takes the form of a series of secondary nozzles 248 leading into the mesh work of passages in the body of the wall, said nozzles receiving their gas from the pipes 249 located in the adjacent partition wall. By means of this arrangement it is possible to initially introduce a full quantity of air into the chambers 239 with only a partial quantity of gas so that the initial combustion takes place in the presence of an excess of air. Subsequently, the secondary gas introduced through the ports 248 will consume all or a portion of this excess of air with consequent reinforcement of the combustion.

As a matter of practice in construction the structure above disclosed may be built in any one of a number of methods, such as by the use of blocks of refractory material such as silica having an average specific heat of .20 as compared to 1.00 for water. When building the wall of such blocks they may be laid in horizontal courses, and these courses will in some cases be duplicates of each other. In Figs. 2 to 16 inclusive, I have shown the typical horizontal sections necessary to illustrate all of the courses which might be used in building the walls particularly illustrated herein. Examination of Figs. 1 and 17 will show that in several cases the sections are duplicates.

The following are the dimensions of the construction illustrated in the drawings, reference being had to the dimension lines shown in the figures:

Length of coking chamber, L, 41'-6"; width of coking chamber at pusher end, W, 12½"; width of coking chamber at coke end, W', 14½"; height of coking chamber up to top of dome, H, 13'-6".

The course shown in Fig. 2 has an average width of 20⅛", and height of 9". It has 23 of the passages 245, each 7" by 5"; it has 24 gas nozzle openings each 4½" by 4½"; and it has 6 side recesses each 6" by 16". The cubic feet of material contained in this course amount to 42.46 cu. ft.

The course shown in Fig. 3 has an average width of 16½", and height of 9". It has 23 of the passages 245, each 8" by 6"; and it has 24 gas nozzle openings each 4½" in diameter. This course contains 35.10 cu. ft.

The course shown in Fig. 4 has an average width of 11½", and height of 9". It has 23 of passages 245, each 10½" by 6"; and it has 24 gas nozzle openings each 4½" in diameter. This course contains 19.66 cu. ft.

The course shown in Fig. 5 has an average width of 17", and height of 9". It has 24 central recesses for the accommodation of portions of the partition wall, each 12" by 3"; it has 23 semi-circular recesses on its inner edge each 4½" in diameter; it has 24 gas nozzles each 2″ in diameter; and it has 46 of the air ports each 2″ by 4½″, these being the air ports 244. This course contains 36.0 cu. ft.

Each of the courses shown in Figs. 6, 7 and 8 has an average width of 12½″, and height of 9″. Each of these courses has 24 of the combustion chamber openings 239 each 13″ by 4½″. Each of these courses contains 28.50 cu. ft.

Each of the courses shown in Figs. 9 and 10 has a total average width of 12½″, and height of 9″. Each of these courses has on its interior a chamber 6″ wide and extending its full length with the exception of 3½″ at each end; and within such chamber there are located a total of 70 ribs 242. Each of these ribs has a width of 3½″, a height of 7½″, (the top portion being beveled at 45° from the vertical), and at each end of the rib there are fillets 1¾″ in radius. Each of these courses contains 23.61 cu. ft.

Each of the courses shown in Figs. 11, 13, 14 and 15 has a total average width of 12½″, and height of 9″. Each of these courses has on its interior a chamber 6″ wide and extending its full length with the exception of 3½″ at each end; and within such chamber are located a total of 70 ribs 242. Each of these ribs has a width of 3½″, and a height of 7½″, (the top portion being beveled at 45° from the vertical), and at each end of the rib there are fillets 1¾″ in radius. Certain of the ribs are carried the full height of the course to provide the partitions 241. Each of these courses contains 23.75 cu. ft.

The course shown in Fig. 12 has an average width of 18″, and height of 9″. It has on its interior a chamber 6″ wide and extending its full length with the exception of 3½″ at each end; and within such chamber are located a total of 70 ribs 242. Each of these ribs has a width of 3½″, a height of 7½″, (the top portion being beveled at 45° from the vertical), and at each end of the rib there are fillets 1¾″ in radius. On its inner edge this course is provided with 23 semi-circular recesses each of 4½″ diameter; and this course is provided with 24 of the secondary gas openings 248, each 2″ in width. This course contains 38.02 cu. ft.

The course shown in Fig. 16 has an average width of 19¼″, and height of 9″. It is provided with 71 openings for the discharge of spent gas, each 3½″ wide, and 6″ long, with circular fillets at its ends. This course contains 23.97 cu. ft.

In summation the courses lying within the height of the oven measured from the floor to the dome of the chamber, and not including the courses shown in Figs. 2 and 16, contain 475.25 cu. ft. in each heating wall. Since there are two heating walls for the chamber the total volume of material in these heating walls amounts to 950.50 cu. ft. Since a chamber of the dimensions previously given contains 583.5 cu. ft., it follows that the ratio of cu. ft. of material compared to cu. ft. of chamber equals 950.50 divided by 583.5 or 1.64. If we include the material contained in the courses shown in Figs. 2 and 16 we find a total of 541.68 cu. ft. in each wall or a total of 1083.36 cu. ft. in the two heating walls of the oven. In this case the ratio of cu. ft. of material compared to cu. ft. of chamber will equal 1083.36 divided by 583.5 or 1.86.

When using silica which has an average weight of 130 pounds per cu. ft. the total weight of material in the two heating walls of the oven will be 950.50 multiplied by 130 which equals 123,656 pounds. On the assumption of a charge of 15 tons of pulverized coal, which equals 30,000 pounds, the ratio of mass of heating wall compared to mass of coal is 4.12, when disregarding the courses shown in Figs. 2 and 16. If we include the mass of these courses, we obtain a total mass of 1,083.36 multiplied by 130 or 140,837 pounds. On the same assumption of a charge of 15 tons of pulverized coal the ratio of mass of heating wall compared to mass of coal is 4.69.

In the foregoing calculations I have not included the mass of a false bottom laid on the floor of the oven chamber, and shown at 250 in Fig. 17; nor have I included the mass of the relatively small damper blocks 246 best shown is Figs. 1 and 4 since in some cases these elements would be eliminated or modified. Neither have I included any portion of the mass of the separating walls since in many cases the contact between such walls and the heating walls would be relatively imperfect so that heat would not be readily transferred. In case the mass of the false bottom should be included this would add approximately 14.8 cu. ft. of material, which with an average weight of 130 pounds per cu. ft. would increase the weight by 1,920.0 pounds.

A calculation will show that each heating wall has an area of heat absorbing surface within its passages measured from the tops of the combustion chambers 239 down to the level of the floor of the chamber, equal to 1,287.62 sq. ft., which is exclusive of the area of the course shown in Fig. 16, within which course there is an additional area of 39.5 sq. ft. Disregarding this course the total area of both walls of the oven would be 2,575.24 sq. ft. Since the area of the walls presented to the chamber equals 1,120.5 sq. ft., the ratio of heat absorbing to heat transmitting surfaces equals 2,575.24 divided by 1,120.5 or 2.30. If the area of passages in the course shown in Fig. 16 be also included the total area will become 2,654.24 of heat absorbing surface, which divided by 1,120.5 equals a ratio of 2.37.

Examination of the construction above explained will show that the thickness of material in the heating walls between the heating gas passages and the surface of the chamber is 3¼". This thickness of material naturally affects the ability of the structure to deliver heat rapidly on demand to the coking mass, since the greater the thickness of material the more the heat flow is retarded. This thickness of material is estimated on the basis of locating the flues or other heating gas passages centrally in the heating walls and in case they were to be located otherwise than centrally the thickness of material would be correspondingly modified.

It is to be noted that in the foregoing calculations of mass of heating walls and volume of material contained in them I have included the material above the heating flues or passages and below the elevation of the roof of the coking chamber. A further calculation will show that the total volume of material in the heating wall or walls of the oven measured from the floor up to and including the top of the uppermost passages is 769.1 cu. ft. Comparing this volume of material with the total volume of the wall contained between the upper and lower limits mentioned above, we find that the ratio of material compared to total volume within said limits is .73. These figures may be regarded as representing the relative solidity of the heating walls within the heating zones, since they indicate the portions of heating walls occupied by solid matter, the remaining portion being occupied by flues or heating gas passages wherein heating action is taking place. This ratio therefore expresses the ability to secure, within these portions of the heating walls, heat storage capacity combined with ability to transfer heating gases, and represent a relative balance of conditions since an increase in size of passages to enable a more easy movement of gases will be accompanied by a decrease in the relative solidity of the structure. This ratio is also an indication of ability to secure a flow of heat from the passages to the surfaces of the coking chamber since the ability of the wall material to conduct heat will be improved by an increase in the relative solidity of the wall, other things being equal.

On the assumption of 130 pounds per cu. ft. of material the volume expressed in the foregoing paragraph may be expressed in pounds of silica as follows: 99,883 pounds of silica. Comparing this amount with an assumption of 30,000 pounds of coal in the chamber we find the following ratio which expresses the amount of silica within the above mentioned upper and lower limits, compared to amount of coal.

Since the total heat stored in the walls has to be transmitted to the coal through the surfaces presented in the coking chamber, and since the total heat storage capacity thus transfers its heat we may compare the cu. ft. of material in the heating walls of the oven with the number of sq. ft. of surface presented in the chamber by said walls with the following result: .85 cu. ft. wall material per sq. ft. surface, including only the material actually between the elevations of the roof and floor of the chamber. If we compare the cu. ft. of wall material contained between the elevations of the upper and lower limits of the passages for heating gases with the surface of chamber contained within such limits we secure the following ratio: .82 cu. ft. material sq. ft. surface.

A further calculation will show that in the construction herein illustrated and described, the ratio of total volume of silica of the heating walls of the oven, compared to total volume of the oven itself, is as follows: 1.51 (when disregarding the sections shown in Figs. 2 to 16), or 1.72 (when including said sections). A similar calculation in which the volume of silica within the heating zone (contained between the upper and lower limits of the heating flues or passages) is compared with the volume of chamber immediately opposite to such zone shows the following ratio: 1.32.

The ability to secure a very rapid flow of fresh heat from the heating gases to the face of the chamber depends not only on ability to absorb the heat from the gases into the body of the wall, which ability depends largely on the area of gas passages presented to the gases; but also depends upon the distance which the heat must travel by conduction through the material of the wall. The smaller this distance may be made as an average amount, the more easily may the heat be gotten to the surface of the chamber. The center of flow of the gases through the passages may for practical purposes be considered as measuring the average point of commencement of flow of heat, and the distance of said center of flow from the surface of the chamber will be a practical measure of the average distance which the heat must travel. In those cases in which a single large heating wall is placed between two chambers, and is provided with a single set of large flues the heat will flow in both directions from the gases thereof to both faces of the wall, and in such case the gases may be considered as comprising two streams flowing side by side within a single flue, one stream supplying heat in one direction, and the other stream supplying heat in the other direction. In such case the distance mentioned above may be measured as from the center of each stream to the face which it serves. A calculation will show that the average distance of heat flow is as follows: 6.25 inches.

The net or effective conductivity of the material of the heating walls to transfer heat through their body to the surface of the chamber may also be measured as the quotient of cross sectional area through which the heat flows divided by the distance through which it travels, according to the well understood principles of thermo-dynamics. In the present cases the heat flows through two sections of wall, one being the wall material lying between the gas passages and the face of the chamber, and the other being the material between the gas passages themselves. By ascertaining the conductivities of these two sections independently, and then adding them by taking the reciprocal of their reciprocals, in accordance with well understood principles of thermo-dynamics we secure the following amount: 1,373.0. This figure may be considered as representing the combined conductivities of the wall material contained between the flues or passages and that which lies immediately between the flues or passages and the face of the chamber. It is estimated on the basis of the distances of heat flow given in the preceding paragraph, in conjunction with the wall dimensions previously mentioned herein.

A similar calculation of conductivity of that portion of the heating walls lying in each case immediately between the flues or passages and the face of the chamber, including also the wall material between the partitions and the face of the chamber gives the following results: 1,724.0. This conductivity is larger than the combined amounts given in the preceding paragraph since the present conductivities are not lowered by the additional distance of material contained in the partitions between the passages. Taking the mean amounts as the average conductivities we secure the following: 1,548.5.

It is to be observed that the aforementioned average conductivities are secured in conjunction with the relative solidities previously explained herein which two figures may serve to express heat storage ability and ability to conduct fresh heat from the gases to the chamber.

It is to be observed that the heating walls may be built in a large number of manners, either from the use of blocks, or as monolithic structure, or in any suitable manner. In this connection, a suitable form of construction is by the use of notched blocks of the general type heretofore disclosed in Letters Patent of the United States No. 1,132,625, issued to me March 23, 1915, as well as numerous other Letters Patent of the United States actually issued and applications filed.

It is also to be observed that as far as the heat storage capacity or ability of the walls is concerned it is quite immaterial as to the exact manner in which the heat is generated therein. This heat may be generated either by the use of burning gases as in each of the structures illustrated herein or by electrical means, or in any other suitable manner. In such cases the heat storage capacity will also include that of such heating mechanism in case such mechanism possesses in itself an appreciable heat storage capacity.

It is also to be observed that in case other material than silica be used for the construction of the heating walls the required or desired heat storage capacity may be secured by the use of a proper relative volume of such other material, taking account of the relative specific gravity and specific heat of such other material as compared to silica.

I claim:

A coke oven heating wall of silica having a length of substantially 41'-6", a height of substantially 13'-6", and a thickness of substantially 1'-7/8", and having on its interior substantially 24 combustion chambers each substantially 13" by 4½" and 27" high and having beneath said combustion chambers a mesh work of interconnected passages for the transfer of heating gases, there being substantially 71 passages each substantially 3½" wide and 6" long, substantially as described.

ARTHUR ROBERTS.